United States Patent
Boszormenyi

[19]

[11] Patent Number: 6,165,583
[45] Date of Patent: Dec. 26, 2000

[54] SURFACE MODIFICATION OF MAGNETIC RECORDING SUBSTRATES TO CONTROL SUBSEQUENT LASER TEXTURING

[75] Inventor: Istvan M. Boszormenyi, Hayward, Calif.

[73] Assignee: Seagate Technology, Inc., Scotts Valley, Calif.

[21] Appl. No.: 09/149,516

[22] Filed: Sep. 8, 1998

Related U.S. Application Data

[60] Provisional application No. 60/058,239, Sep. 8, 1997.

[51] Int. Cl.[7] ................................................ G11B 5/66
[52] U.S. Cl. ........................... 428/65.3; 428/694 TS; 428/694 TR; 428/694 SG; 428/900; 427/128; 427/129; 427/130
[58] Field of Search ..................... 428/65.3, 694 TS, 428/694 TR, 694 SG, 900; 427/128–130

[56] References Cited

U.S. PATENT DOCUMENTS

| | | | |
|---|---|---|---|
| 5,108,781 | 4/1992 | Ranjan | 427/53.1 |
| 5,302,434 | 4/1994 | Doerner | 428/65.3 |
| 5,436,047 | 7/1995 | Howard | 428/64.2 |
| 5,626,943 | 5/1997 | Tenhover | 428/141 |
| 5,681,635 | 10/1997 | Nelson | 428/65.3 |
| 5,726,108 | 3/1998 | Taguchi | 501/5 |
| 5,965,230 | 10/1999 | Sugita | 428/65.3 |

*Primary Examiner*—Leszek Kiliman
*Attorney, Agent, or Firm*—Larkin, Hoffman, Daly & Lindgren, Ltd.; Frederick W. Niebuhr, Esq.

[57] ABSTRACT

Nonmagnetic substrate disks used to fabricate magnetic data storage media are surface treated prior to laser texturing, to enhance characteristics of the resulting texturing features and the surface topography provided by the features. In one approach, nickel-phosphorous plated aluminum substrates are maintained in an aqueous silicate solution, preferably sodium metasilicate at about a 5 percent concentration, by weight. An alternative approach involves maintaining the substrates in an aqueous borate solution, for example, sodium tetraborate decahydrate at about 5 grams per liter. In both cases a silicate or borate is deposited onto the substrate, forming an oxidation layer that changes the surface characteristics at and near the substrate surface, more particularly to a depth of 50–60 angstroms beneath the surface. The changes in surface composition include a reduction in the nickel concentration, and an increase in either silicon or boron. As a result, subsequent laser texturing produces features, e.g., rims or nodules, with reduced heights, substantially more uniformity in their heights, and more favorable diameter-to-height ratios. Alternative treatments include etching, followed by oxidation in aqueous oxidizing agents.

46 Claims, 10 Drawing Sheets

SURFACE MODIFICATION OF MAGNETIC RECORDING SUBSTRATES TO CONTROL SUBSEQUENT LASER TEXTURING

This application claims the benefit of Provisional Application No. 60/058,239 entitled "Surface Modification to Control Laser Texture Bump Uniformity", filed Sep. 8, 1997.

BACKGROUND OF THE INVENTION

The present invention relates to the texturing of magnetic data storage media, and more particularly to surface treatments applied to media substrates to modify the results of subsequent laser texturing.

Laser texturing of magnetic disks, particularly over areas designed for contact with data transducing heads, is known to reduce friction and improve wear characteristics as compared to mechanically textured disks. Traditional laser texturing involves focusing a laser beam onto a disk substrate surface at multiple locations, forming at each location a depression surrounded by a raised rim as disclosed in U.S. Pat. No. 5,062,021 (Ranjan) and U.S. Pat. No. 5,108,781 (Ranjan). An alternative, as disclosed in International Publications No. WO 97/07931 and No. WO 97/43079, is to use a laser beam to form domes or nodules (also called bumps) rather than rims. The texturing features can have either circular or elliptical profiles.

Collectively, the texturing features form a texture pattern that provides a desired surface roughness throughout the transducing head contact zone. A particularly preferred pattern is a spiral, formed by rotating the substrate disk at a controlled angular speed while moving a laser radially with respect to the disk. The laser is pulsed to form the individual texturing features. Although this approach has been highly successful in terms of reducing dynamic friction and improving the wear characteristics of dedicated transducing head contact zones, the texturing features, whether rims or nodules, tend to vary as to their height, i.e., the outward projection from a nominal surface plane of the transducing head contact zone. The desirable range of feature heights is limited, at the low end by the need to avoid stiction. The maximum feature heights are limited by the desired glide height, i.e. the distance of a transducing head from the nominal surface plane when supported aerodynamically due to disk rotation. As glide heights are reduced, the variance among feature heights becomes more of a problem.

The reduced transducing head glide heights or flying heights also raise the need for texturing features with reduced heights, to avoid turbulence in the air bearing and minimize the risk of unintended head/disk contact when the data transducing head is near the contact zone. This has motivated designers to reduce the heights of the laser texturing features, which also may involve reducing the diameters of the features. To maintain the stability of texturing features, it would be desirable to reduce the feature heights without the proportional reduction in their diameters.

Therefore, it is an object of the present invention to provide a laser textured magnetic data storage medium in which the texturing features, whether rims or nodules, are more uniform in height throughout the transducing head contact zone.

Another object is to provide a magnetic data storage medium substrate with surface characteristics selectively altered to enhance the results of subsequent laser texturing by improving uniformity of texturing feature heights, improving feature diameter-to-height ratios, or both.

A further object of the invention is to provide a process for controllably altering surface properties of magnetic disk substrates to improve the surface topography produced by subsequent laser texturing.

Yet another object is to provide a magnetic data reading and storage apparatus in which more uniform texturing features with reduced heights, preferably without corresponding reductions in their diameters, permit lower transducing head glide heights.

SUMMARY OF THE INVENTION

To achieve these and other objects, there is provided a non-magnetizable substrate for supporting a magnetic thin film to provide a magnetic data storage medium. The substrate includes a substrate base formed of a non-magnetizable material. A non-magnetizable metallic layer is formed over the substrate base and has a substantially planar substrate surface. A control layer is provided along the substrate surface of the metallic layer, and consists essentially of at least one of the following: a water soluble borate, and a water soluble silicate.

The control layer alters the characteristics of the non-magnetizable metallic layer near the substrate surface, more particularly throughout a near surface region that includes the substrate surface and extends inwardly to a depth up to about 60 angstroms. The near surface region is quite small in proportion to the non-magnetizable metallic layer, which typically has a thickness in the range of 2–10 microns. Nonetheless, the change in the surface can substantially and favorably influence the results of subsequent laser texturing, by reducing the heights of bumps, rims or other features formed by laser texturing, reducing the variance in the heights of the features, and further by reducing feature heights without causing a corresponding reduction in feature diameters. The resulting improvement in diameter-to-height ratio increases feature stability.

The control layer can consist essentially of the water soluble borate, more particularly sodium tetraborate. The desired control layer can be formed by soaking the substrate, initially consisting of the substrate base and the non-magnetizable metallic layer, in a sodium tetraborate decahydrate solution, e.g. at a concentration of 5 grams per liter for about twenty minutes at a temperature of about 50° C. Parameters can be adjusted. For example, a 10 g/l concentration or a higher temperature would reduce the required soaking time. When the non-magnetizable metallic layer is formed of a nickel phosphorous alloy, this treatment reduces the concentration of nickel throughout the near surface region, reducing the heights of subsequently formed laser texturing features when other parameters remain the same. The treatment also introduces a concentration of boron throughout the near surface region. The boron acts like a flux to reduce the melting temperature at the surface, and also is believed to alter the surface tension, leading to a considerable reduction in the variance of texturing feature heights.

Alternatively the control layer consists essentially of the water soluble silicate, more particularly sodium metasilicate. The control layer can be formed by maintaining the substrate, again consisting of the substrate base and the non-magnetizable metallic layer, in a sodium metasilicate solution (concentration of less than 5 percent by weight) maintained at 20–70° C., for about ten minutes, more preferably for at least about thirty minutes. Again, when the non-magnetizable metallic layer is an alloy including nickel, the concentration of nickel throughout the near surface region is reduced for a reduction in texturing feature heights.

A concentration of silicate is introduced throughout the near surface region, at least about 5 atomic percent and more preferably more than 8 atomic percent. This improves the diameter-to-height radio of the laser texturing features, e.g. from about 250, to a ratio of over 700 corresponding to a silicate concentration of about 13 percent. The result is a more stable laser texturing feature.

The preferred material for forming the substrate base is aluminum. A glass substrate also can be used, although the much lower conductivity as compared to aluminum results in increased texturing feature heights, all other factors being equal. The preferred non-magnetizable metallic layer is formed of a nickel phosphorous alloy, typically with phosphorous at about 11 percent.

Further in accordance with the present invention, there is provided a process for fabricating a recording medium substrate, including:

a. providing a substrate body including a non-magnetic substrate base and a non-magnetic metallic layer formed over the base and defining a substantially planar substrate outer surface, said non-magnetic metallic layer including nickel at more than 23 atomic percent; and b. controllably oxidizing the substrate body, at least over a selected surface region of the substrate surface, to form a near surface region of the substrate body including the substrate surface and extending inwardly from the substrate surface to a depth up to about 60 angstroms, in which the concentration of nickel is less than about 15 atomic percent.

Preferably, the controlled oxidizing further includes introducing a concentration of a borate, or introducing a concentration of a silicate. In either event, the preferred approach is to soak a substrate, initially consisting of the substrate body and the non-magnetic metallic layer, in an acqueous solution of the borate or the silicate.

Thus in accordance with the present invention, the surface of a non-magnetic substrate is selectively altered whereby subsequent laser texturing produces smaller, more uniform and more stable texturing features.

IN THE DRAWINGS

For a further appreciation of the above and other features and advantages, reference is made to the following detailed description and to the drawings, in which.

DETAILED DESCRIPTION OF THE PREFERRED EMBODIMENTS

Figure 1:
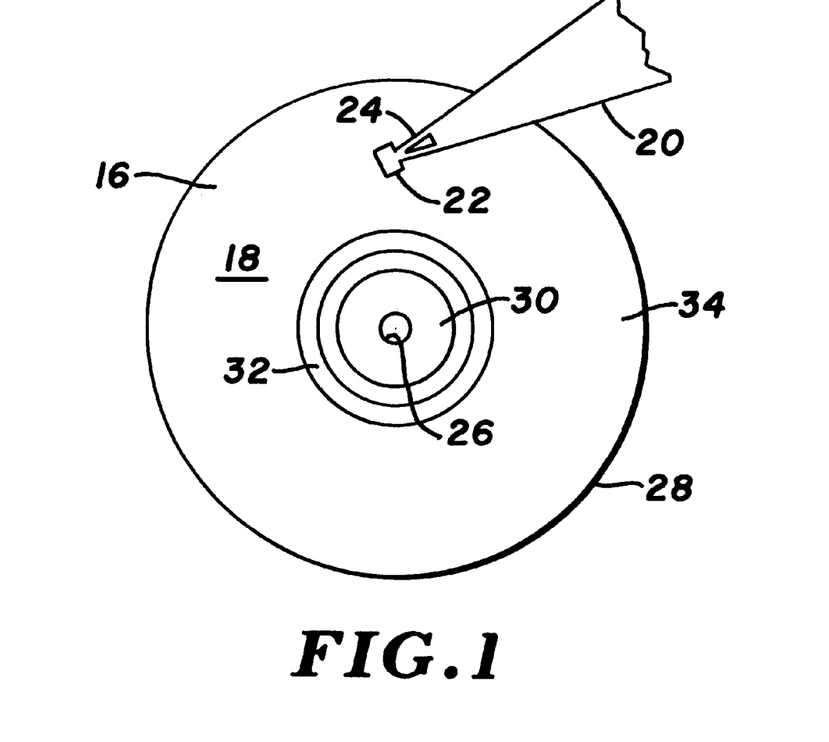
FIG. 1 is a plan view of a magnetic data storage disk having a transducing head contact zone textured in accordance with the present invention, and a partial view of a disk drive including a data transducing head supported for generally radial movement relative to the disk.
Figure 2:
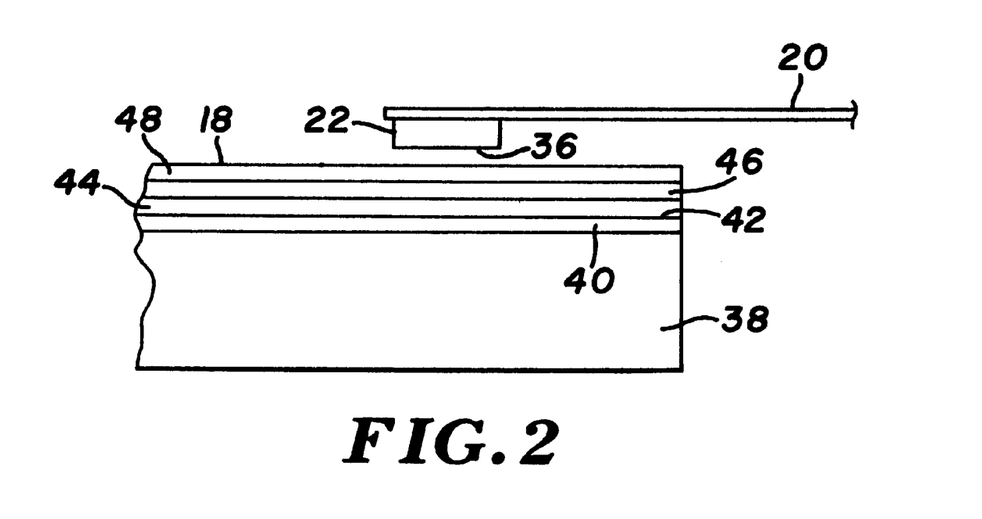
FIG. 2 is an enlarged partial sectional view of the magnetic disk in FIG. 1.
Figure 3:
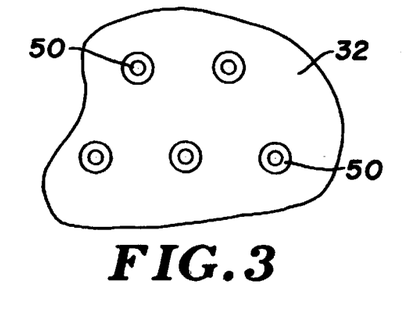
FIG. 3 is a partial top plan view of the disk, showing texturing features in a contact zone of the disk.

Turning now to the drawings, there is shown in FIGS. 1–3 a medium for reading and recording magnetic data, in particular a magnetic disk 16 rotatable about a vertical axis and having a substantially planar horizontal upper surface 18. A rotary actuator (not shown) carries a transducing head support arm 20 in cantilevered fashion. A magnetic data transducing head 22 (including magnetic transducer and air bearing slider) is mounted to the free end of the support arm, through a suspension 24 which allows gimballing action of the head, i.e., limited vertical travel and rotation about pitch and roll axes. The rotary actuator and the support arm pivot to move head 22 in an arcuate path, generally radially with respect to the disk.

At the center of disk 22 is an opening to accommodate a disk drive spindle 26 used to rotate the disk. Between the opening and an outer circumferential edge 28 of the disk, upper surface 18 is divided into three annular regions or zones: a radially inward zone 30 used for clamping the disk to the spindle; a dedicated transducing head contact zone 32; and a data storage zone 34 that serves as the area for recording and reading the magnetic data.

When the disk is at rest, or rotating at a speed substantially below its normal operating range, head 22 contacts upper surface 18. When the disk rotates at higher speeds, including normal operating range, an air bearing or cushion is formed by air flowing between the head and upper surface 18 in the direction of disk rotation. The air bearing supports the head above the upper surface. Typically the distance between a planar bottom surface 36 of head 22 and upper surface 18, known as the head "flying height," is about 2 microinches (51 nm) or less. Lower flying heights permit a higher density storage of data.

For data recording and reading operations, rotation of the disk and pivoting of the support arm are controlled in concert to selectively position transducing head 22 near desired locations within data zone 34. Following a data operation, the disk is decelerated and support arm 20 is moved radially inward toward contact zone 32. By the time the disk decelerates sufficiently to allow head/disk contact, the head is positioned over the contact zone. Thus, head contact with other regions of the disk surface is avoided. Before the next data operation, the disk is accelerated, initially with head 22 engaged with disk 16 within the contact zone. Support arm 20 is not pivoted until the head is supported by an air bearing, above the contact zone.

Magnetic disk 16 is formed by mechanically finishing an aluminum substrate disk 38 to provide a substantially flat upper surface. Typically a nickel-phosphorous alloy has been plated onto the upper surface of the substrate disk, to provide a non-magnetizable layer 40 with a uniform thickness in the range of about 2–10 microns. Following plating, the exposed upper surface 42 of the Ni—P alloy layer is polished to a roughness of about 0.1 micro inch (2.54 nm) or less.

After mechanical finishing, substrate surface 42, at least along contact zone 32, is laser textured to provide a desired surface roughness. Laser texturing involves melting the substrate disk at and near surface 42, forming texturing features as will be described in greater detail below.

Fabrication of disk 16 involves the application of several layers after texturing. The first of these is a chrome underlayer 44 with a typical thickness of about 10–100 nm, deposited in crystalline form. Next is a magnetic thin film recording layer 46, where the data are stored, typically deposited at a thickness of about 10–50 nm. The final layer is a protective carbon layer 48, in the range of 5–30 nm in thickness. Layers 44, 46 and 48 are substantially uniform in thickness, and thus replicate the texture of substrate surface 42.

Laser texturing involves forming discrete features such as depressions surrounded by raised rims, or nodules (also called bumps or domes) in the substrate disk at surface 42. The size and shape of the features depends on the level of laser beam energy impinging upon surface 42. Typically the features are formed in a spiral path, having a circumferential pitch governed by the disk rotational speed and laser pulsing interval during texturing. A radial pitch, i.e., the radial distance between consecutive turns of the spiral path, is determined by disk rotation and the rate of radial shifting of the laser relative to the disk. The result of the traditional laser texturing is a disk having a textured head contact zone with a uniform circumferential pitch, i.e., a uniform spacing or distance interval between consecutive features.

Figure 4:
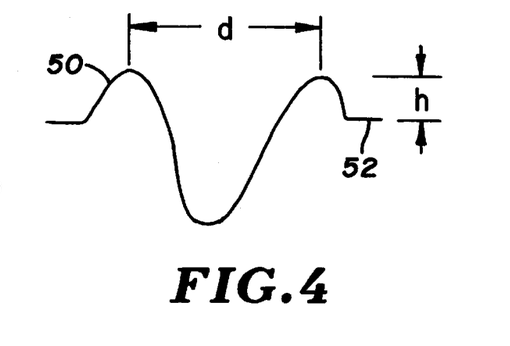
FIG. 4 is a schematic profile view of one of the texturing features.

FIG. 4 illustrates the profile of one of several rims 50 in FIG. 3. The height of the rim, designated "h", is the distance between nominal surface plane 52 and the peak of the rim. The texturing feature further incorporates a central depression that extends inwardly to a depth below the nominal surface plane. The rim diameter, designated "d" in the figure, is the distance between peaks on opposite sides of the rim.

Figure 5:
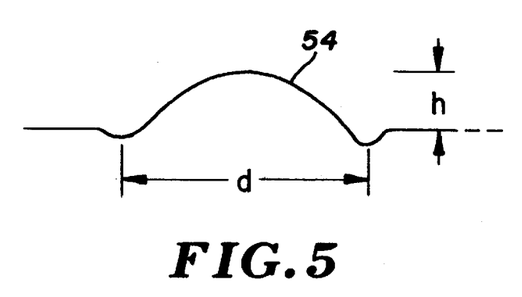
FIG. 5 is a schematic profile of an alternative texturing feature.

At lower energy levels, concentrated laser energy tends to form upwardly protruding bumps or nodules rather than rimmed depressions in the substrate surface. FIG. 5 illustrates the profile of a typical nodule or bump 54. The nodule 54 extends above the nominal surface plane by a height "h", and has a diameter "d". At its base, the nodule is surrounded by a minute annular depression.

The tendency toward formation of nodules, rather than rimmed depressions, arises from reduced energy levels and smaller concentrations of laser energy at the irradiation areas. Beyond this, the tendency is not fully understood. The level of energy at which rimmed depressions become nodules (and vice versa) varies with the substrate material, and further can vary among different batches of substrates formed of the same material. Accordingly, some testing is needed to determine the appropriate energy levels in different situations. In any event, treatments according to the present invention can be employed to improve subsequently formed texturing features, regardless of whether such features are rims or nodules.

Figure 6:
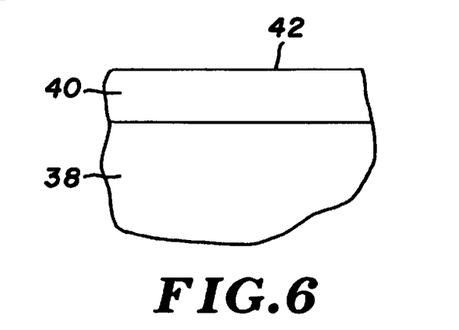
FIG. 6 is an enlarged partial sectional view of a non-magnetizable substrate used to fabricate the data storage disk.

FIG. 6 illustrates substrate disk 38 after the plating of Ni—P layer 40. The outer (upper) surface of the Ni—P alloy layer is substantially planar, providing substrate surface 42. At this stage, substrate surface 42 is mechanically polished to a roughness of about 2.5 nm or less.

Figure 7:
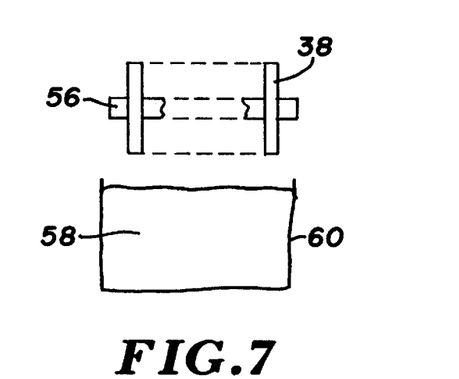
FIG. 7 schematically illustrates an apparatus for surface treating the substrate.

In accordance with the present invention, polished disk substrate 38 is chemically treated to change its surface composition, thus enhancing the results of subsequent surface texturing. FIG. 7 illustrates several disk substrates 38 supported on a rack 56 above a liquid solution 58 in a container 60. The solution is an aqueous silicate solution, in which the concentration of the silicate is less than 5 percent, by weight. With solution 58 maintained at a temperature within the range of 20–70° C., rack 56 is lowered to submerge substrate disks 38. The treatment duration can vary, but should be at least ten minutes, and more preferably at least thirty minutes.

Figure 8:
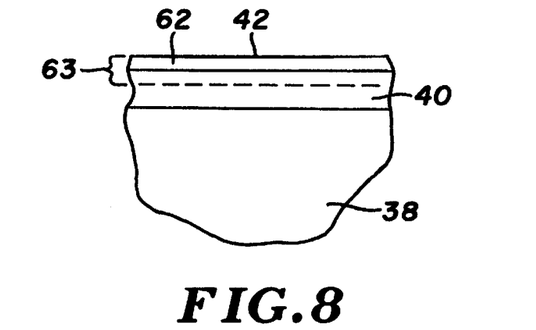
FIGS. 8 and 9 illustrate further substrate treatment stages.

During this treatment, silicate from the solution is deposited onto the substrate disks, forming on each substrate disk a silicate layer 62 as indicated in FIG. 8. The thickness of layer 62 depends on several factors, including the duration of soaking the disk, the concentration of the silicate solution, and its temperature. Increasing the soaking duration and the silicate concentration increase the thickness, while increasing the temperature within the aforementioned range tends to decrease the thickness. In any event, the thickness is uniform, so that the substrate surface remains planar and smooth.

The surface treatment selectively alters substrate surface 42 and the substrate disk immediately adjacent the substrate surface. The change in composition can be measured by x-ray photoelectron spectroscopy (XPS), a surface sensitive approach that yields information about a surface and material beneath the surface to a depth up to about 60 angstroms—frequently but not necessarily to a depth of at least 50 angstroms. Accordingly, the change in disk composition at and near the surface can be conveniently considered in terms of changes to a near surface region 63 of the disk, i.e. that portion of the disk including substrate surface 42 and material to a depth of 60 angstroms or less beneath the surface (FIG. 8). An x-ray photoelectron spectroscope may be employed either before or after texturing to determine changes in surface composition. The heights and diameters of texturing features can be determined using a stylus profilometer or an atomic force microscope (AFM).

Figure 9:
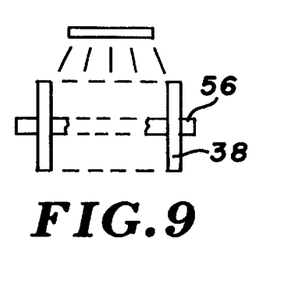
Figure 10:
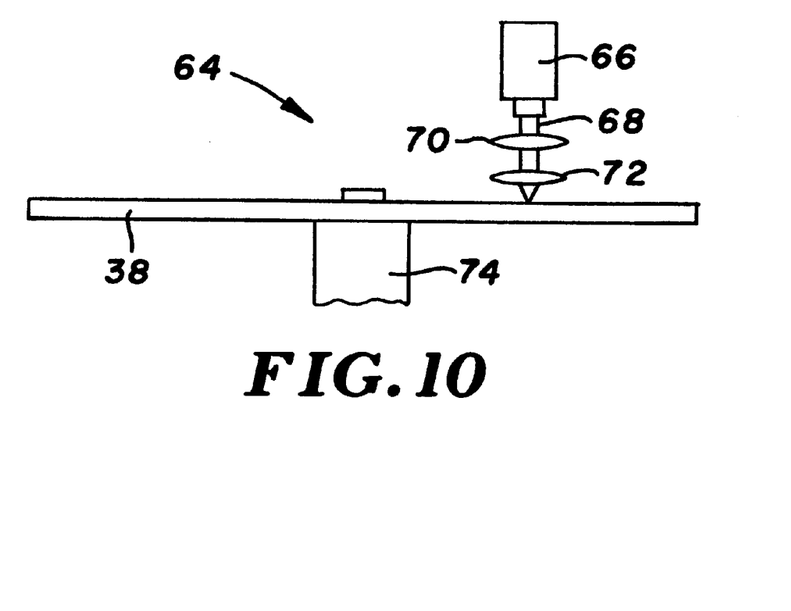
FIG. 10 is a diagrammatic view of a texturing device for forming texturing features on the substrate.

After their removal from the solution, substrate disks 38 are thoroughly rinsed in deionized water as indicated in FIG. 9, then dried (e.g. by spin drying in ambient conditions or at temperatures up to about 50 degrees C.). At this stage, each substrate disk 38 is textured. FIG. 10 shows a laser texturing device 64 including a diode laser 66 operated in a pulsed mode and generating a laser beam 68 in the infrared wavelength range. The beam encounters beam shaping optics including a collimating lens 70 and a focusing lens 72. The beam, emerging from lens 72 is focused on substrate surface 42 of disk 38 at a beam impingement area that typically is circular, but can have an elliptical or other profile if desired. The diameter of the impingement area can be varied by selecting or adjusting the optical components, or by selecting the operating mode of laser 66.

Focusing beam 68 onto the surface of substrate disk 38 causes highly localized melting at the surface. While the disk material resolidifies rapidly, there is sufficient material flow to form a rim or nodule which projects outwardly from the nominal surface plane, or upwardly as viewed in FIG. 10.

The desired texture pattern or array is formed by rotating disk 38 using a spindle 74, and radially translating the disk relative to the laser beam, which can be accomplished either by moving the disk or by moving the laser. To trace the preferred spiral path, disk rotation and radial translation occur simultaneously. The degree of radial translation, with respect to disk rotation, determines the radial pitch or distance between adjacent turns of the spiral path.

Figure 11:
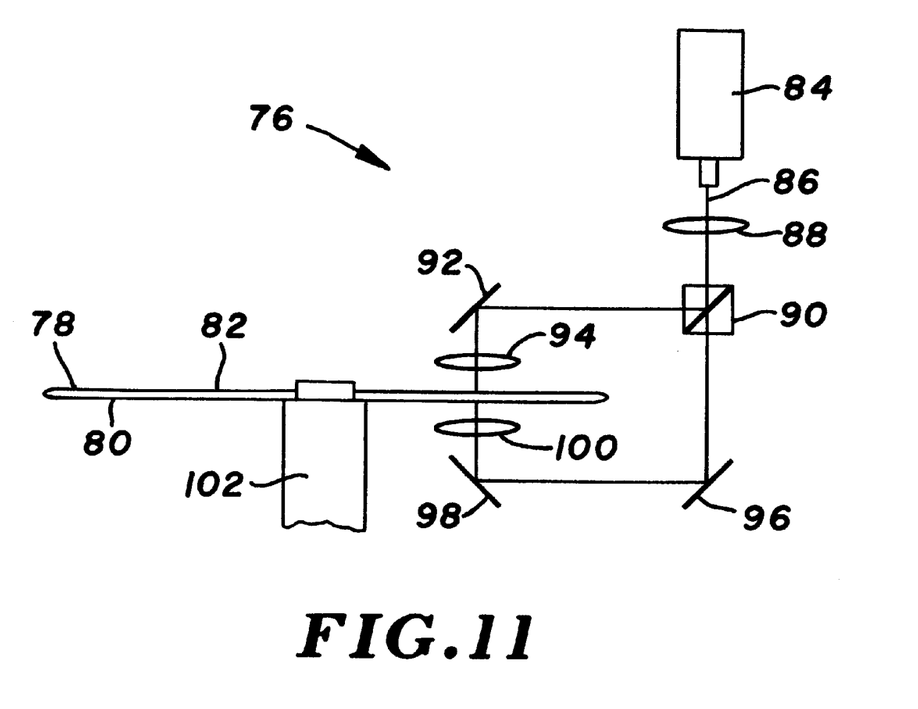
FIG. 11 diagrammatically illustrates an alternative texturing device.

FIG. 11 illustrates an alternative texturing device 76 for simultaneously texturing opposite substrate surfaces 78 and 80 of a substrate disk 82. A diode laser 84 generates a beam 86 that is directed through a collimating lens 88 to a beam splitting prism 90, which provides as its output two orthogonal beams 86a and 86b. A mirror 92 directs beam 86a downwardly through a focusing lens 94 to substrate surface 78. Meanwhile, mirrors 96 and 98 guide beam 86b through a focusing lens 100 to substrate surface 80. A spindle 102 rotates the disk, while either the disk or the laser is moved radially as previously described, to form the desired pattern of texturing features.

Figure 12:
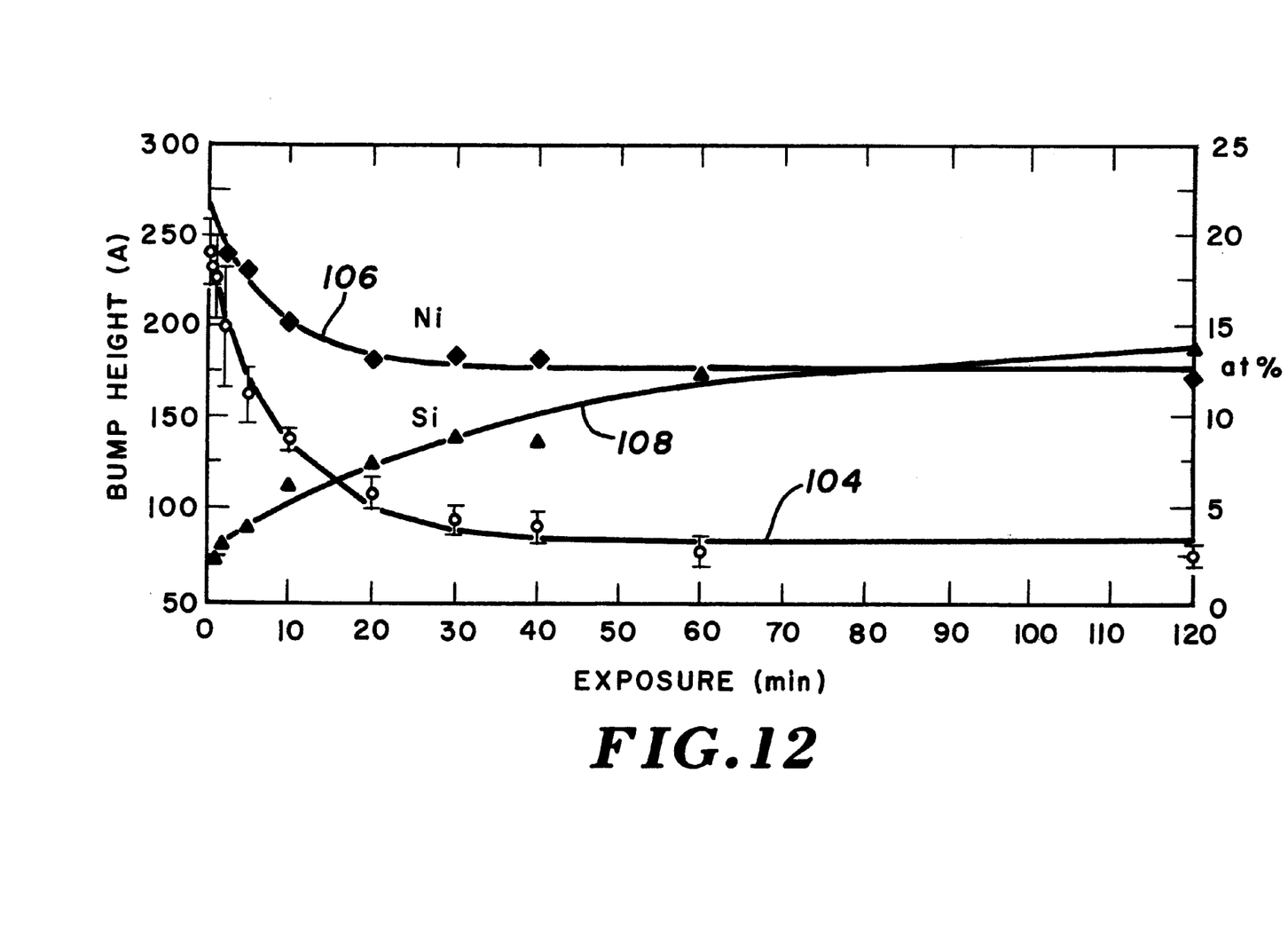
FIGS. 12–15 are graphs illustrating characteristics of the substrate surface and the texturing features as a result of the surface treatment.
Figure 13:
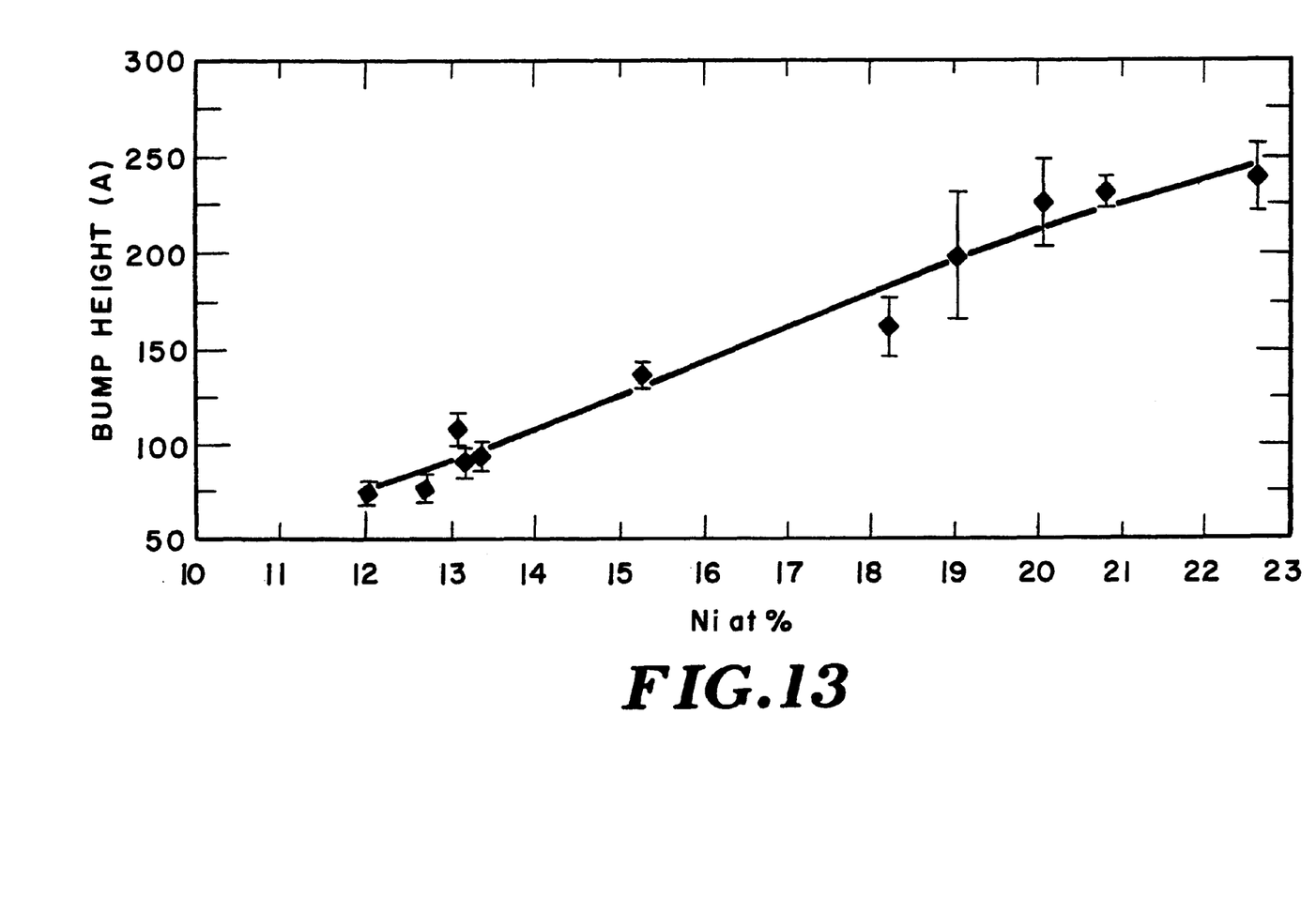

The measurements of surface composition and texturing features can be performed on treated and untreated disks, to demonstrate the favorable results of the surface treatment. The chart in FIG. 12 illustrates several factors that vary with changes in the duration of exposure or submersion of the substrate disk in the aqueous silicate solution. More particularly, a curve 104 illustrates texturing feature height "h" as a function of the duration of exposure. Feature heights decrease rapidly initially, from a height of about 240 angstroms to about 135 angstroms after 10 minutes of exposure, and to slightly over 90 angstroms after 30 minutes of exposure. Exposures times greater than 30 minutes do not afford any substantial further height reductions. The concentration of nickel within near surface region 63 (curve 106) exhibits similar behavior, decreasing from about 23 atomic percent to about 15 atomic percent after 10 minutes of exposure, further decreasing to less than 13 atomic percent after 30 minutes of exposure, and not decreasing significantly thereafter. As seen in FIG. 13, the relationship between the decrease in texturing height and the decrease in nickel concentration is essentially linear, at least over the range of treatments measured.

Figure 14:
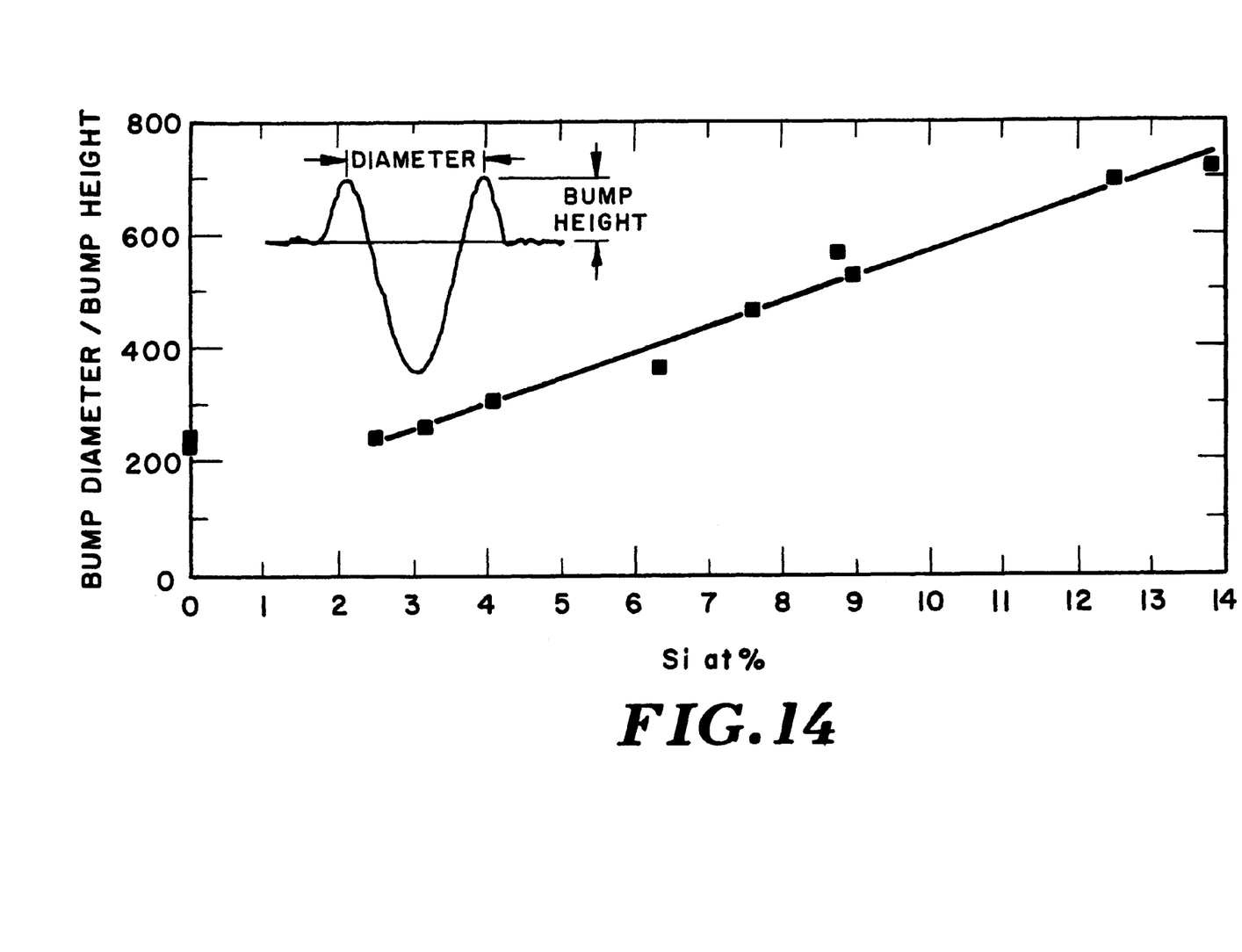

Curve 108 in FIG. 12 illustrates the increase in the concentration of silicon throughout near surface region 63 as the duration of exposure increases. The silicon concentration in terms of atomic percent increases to about 5 percent after about ten minutes of exposure, to slightly above 8 percent after thirty minutes of exposure, and to about 14 percent after two hours of exposure. The increased silicon concentration is desirable for its tendency to improve the stability of individual texturing features. In particular, as seen from the chart in FIG. 14, there is a substantially linear relationship between increasing concentration of silicon (atomic percent) and an increasing ratio of texturing feature height as compared to texturing feature diameter. In essence, the increased silicon appears to allow a reduction in texturing feature heights while the texturing feature diameters either remain constant, or are reduced but at a substantially lower rate than the rate of reduction in height. The higher diameter-to-height ratios improve the stability of the texturing features, in terms of their capacity to resist reductions in height, during subsequent processing (deposition) stages.

Figure 15:
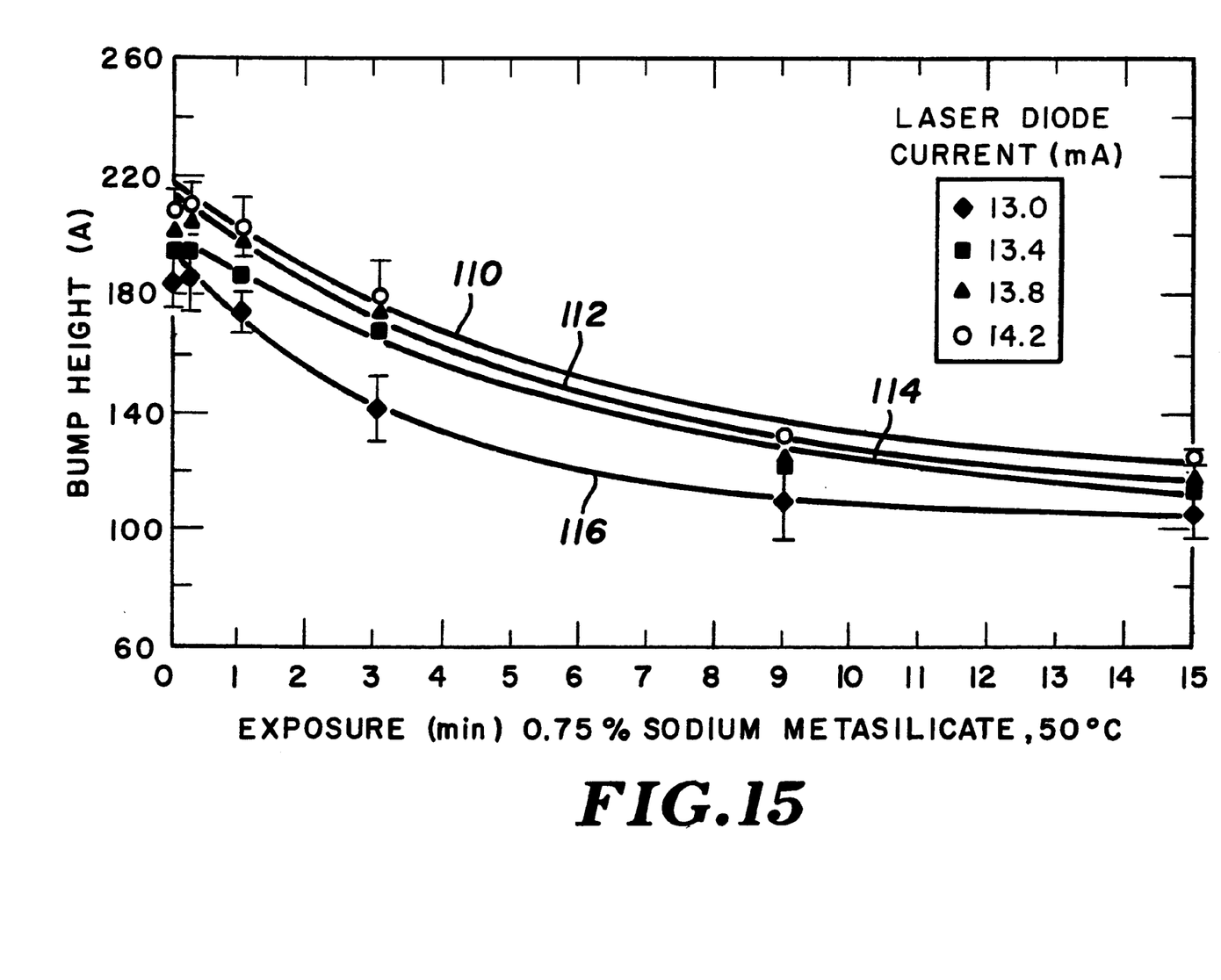

FIG. 15 is a chart with four curves 110, 112 and 116 illustrating texturing feature height as a function of the time of exposure to the sodium metasilicate solution maintained at 50° C.; in conjunction with laser diode settings of 14.2 mA., 13.8 mA., 13.4 mA. and 13.0 mA., respectively. All curves illustrate substantially the same quality of diminishing feature heights as a function of increased exposure, and also show the tendency of increased laser power to form taller texturing features. Accordingly, surface treatments according to the present invention can be used in conjunction with selective settings of the laser, to yield rims or nodules of a desired size.

According to an alternative embodiment process, a substrate disk is polished, then maintained in an aqueous borate solution, more particularly a solution of sodium tetraborate decahydrate ($Na_2B_4O_7.10\ H_2O$) at 5 grams per liter. After maintaining the disk in solution for the desired time (e. g. twenty minutes, typically less than one hour), the substrates are rinsed using deionized water as before, then dried. Texturing was accomplished with a device such as that illustrated in FIG. 11, thus to texture both sides of each substrate disk.

Figure 16:
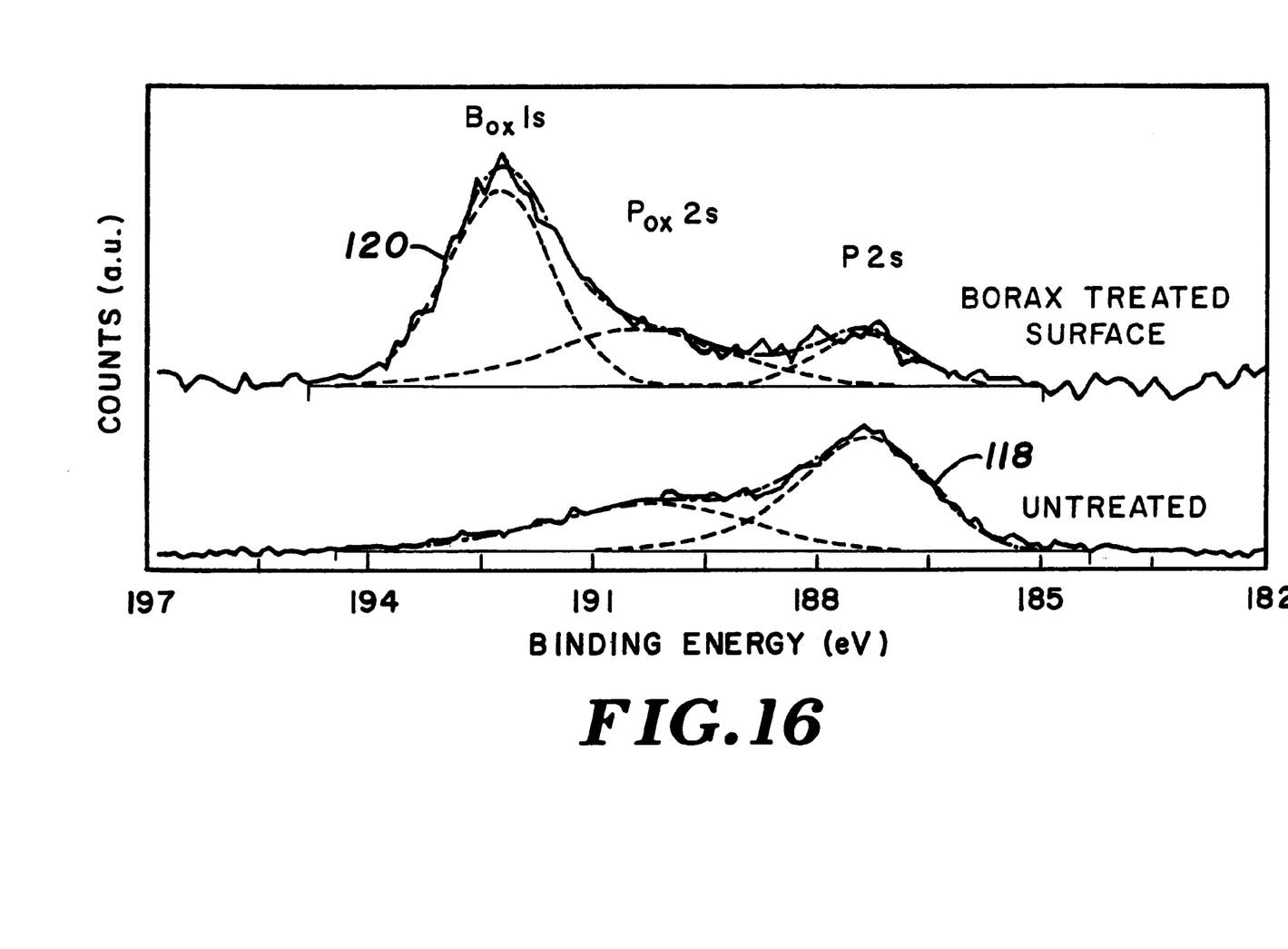
FIGS. 16 and 17 are graphs illustrating characteristics of the texturing features and substrate surface of a substrate disk treated according to an alternative embodiment process.

X-ray photoelectron spectroscopy (XPS) readings for surface treated and untreated disks are shown adjacent one another in FIG. 16. A curve 118 representing the untreated disks shows a slight rise along the binding energy (eV) values associated with phosphorous, and a significantly larger rise corresponding to the binding energies associated with phosphorous oxide. Curve 120 relating to treated disks also rises in the same binding energy ranges, but exhibits a diminished rise for phosphorous oxide. The most substantial rise in curve 120 is along the range of binding energy associated with boron, indicating that a thin boron oxide layer is present on the substrate surface after treatment.

Figure 17:
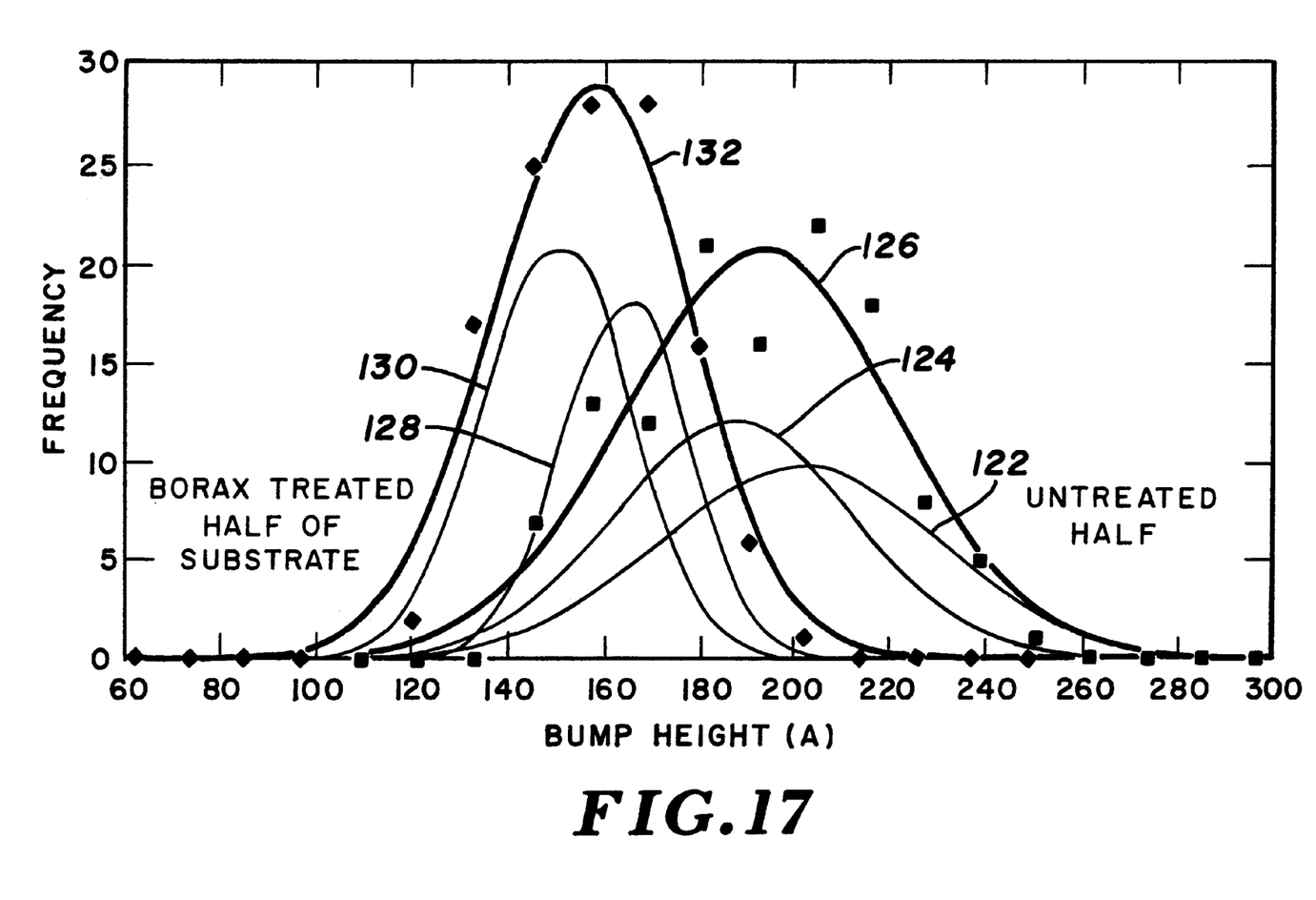

The increased feature height uniformity resulting from the surface treatment is illustrated in FIG. 17, showing frequency distributions of texturing feature heights on a substrate disk with texturing features formed on both sides. Approximately half of the disk was submerged in the aqueous solution of sodium tetraborate, to provide a direct comparison of texturing features formed over treated and untreated regions. In particular, curve 122 represents an untreated region of a first side of the disk, curve 124 represents an untreated region of the second or opposite side of the disk, and curve 126 represents the composite of both sides. Similarly, curves 128, 130 and 132 represent the first side, second side and composite of the treated region of the disk.

The horizontal offset of curve 124 from curve 122 and the similar offset of curve 130 from curve 128, indicate a slightly higher level of laser energy on the first side of the disk, with the result that in both treated and untreated regions the texturing features on the first side are about 15 angstroms taller, on the average. More importantly, the substantially narrower distributions shown by curves 128, 130 and 132, with respect to their counterparts, illustrate the considerably enhanced uniformity resulting from surface treatment.

Figure 18:
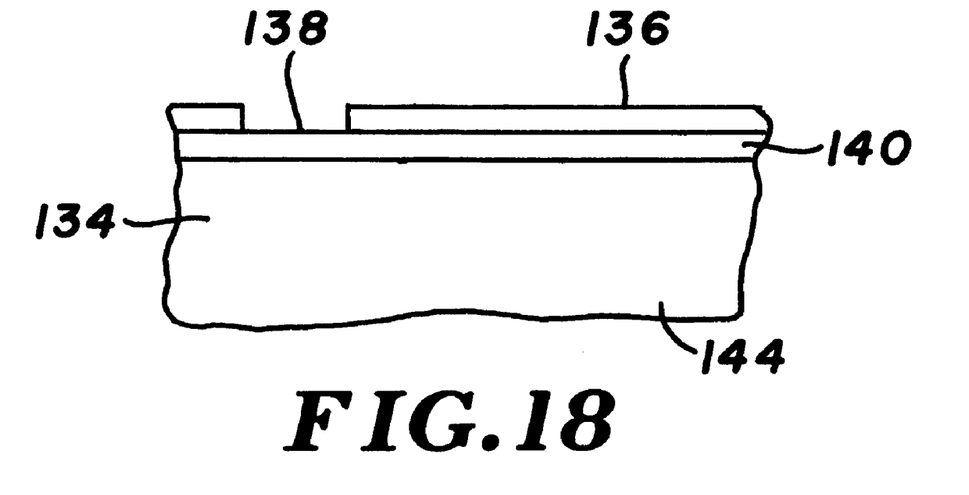
FIGS. 18 and 19 schematically illustrate another alternative embodiment for surface treating substrate disks.
Figure 19:
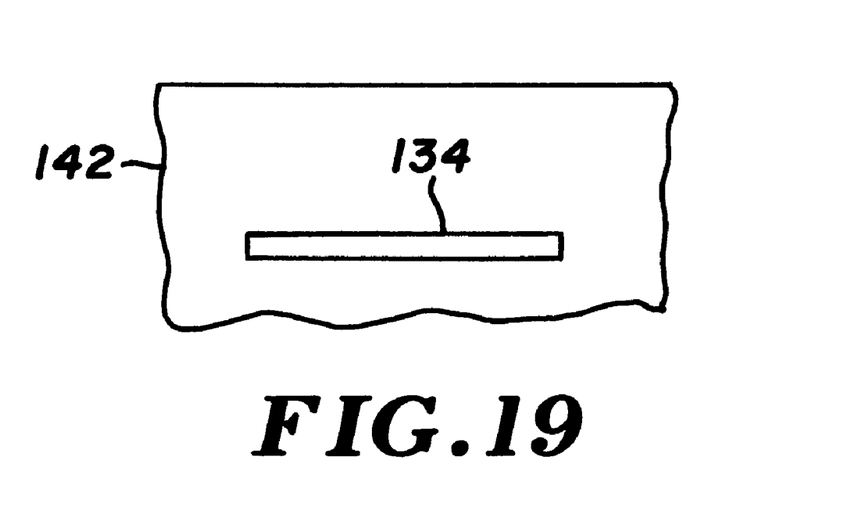

FIGS. 18 and 19 illustrate another alternative, less preferred process for surface treating a disk substrate to enhance subsequent texturing. A substrate disk 134, covered by a mask 136 except for an intended transducing head contact zone 138, is subjected to chemical etching, e.g. with phosphoric acid or nitric acid, to insure that a nickel-phosphorous layer 140 of the substrate disk is exposed, free of any oxidation layer. Next, mask 136 is removed and substrate disk 134 is baked in a chamber 142, either in air, nitrogen, or a nitrogen-oxygen atmosphere. (At 100–150 degrees C.). After baking, the substrate disk can be treated in an aqueous oxidizing agent, and must be so treated after baking in the nitrogen atmosphere. To illustrate another variation from the foregoing approaches, the substrate disk includes a base 144 formed of glass. Although the Ni—P alloy is the practical choice for the metallic non-magnetic layer, alternatives such as Ti, would be expected to benefit from this surface treatment.

Thus in accordance with the present invention, the results of laser texturing of magnetic recording media are enhanced by preliminary surface treatments. In each case an oxidizing layer is formed over the substrate surface to alter the substrate composition at the substrate surface and throughout a region adjacent the surface, extending to a predetermined depth below the surface. This depth, while on the order of angstroms, nonetheless is sufficient to substantially alter the behavior of the substrate material, typically a nickel-phosphorous alloy, when exposed to laser energy, resulting in the formation of texturing features with reduced heights, reduced variation in their heights, and more favorable diameter-to-height ratios.

What is claimed is:

1. A non-magnetizable substrate for supporting a magnetic thin film to provide a magnetic data storage medium, said substrate including:

a substrate base formed of a non-magnetizable material; and a non-magnetizable metallic layer formed over the substrate base and having a substantially planar substrate surface and a metallic layer thickness;

wherein the non-magnetizable metallic layer, within a near-surface region that includes the substrate surface and extends into the non-magnetizable metallic layer to a depth less than said metallic layer thickness, includes a control layer consisting essentially of at least one of the following: a water soluble borate, and a water soluble silicate.

2. The substrate of claim 1 wherein:

said control layer consists essentially of the water soluble borate, and the water soluble borate is comprised of sodium tetraborate.

3. The substrate of claim 2 wherein:

said depth of the near-surface substrate region is at most about 60 angstroms.

4. The substrate of claim 1 wherein:

said control layer consists essentially of the water soluble silicate, and the water soluble silicate is comprised of sodium metasilicate.

5. The substrate of claim 4 wherein:

said near-surface substrate region, including the control layer and an adjacent segment of the non-magnetic layer, incorporates silicon at more than about 5 atomic percent, and said depth of the near-surface substrate region is at most about 60 angstroms.

6. The substrate of claim 5 wherein:

said near-surface substrate region incorporates the silicon at more than about 8 atomic percent.

7. The substrate of claim 1 wherein:

said non-magnetizable substrate base is formed of aluminum.

8. The substrate of claim 1 wherein:

said non-magnetizable substrate base is formed of glass.

9. The substrate of claim 1 wherein:

said non-magnatizable metallic layer is formed of a nickel-phosphorus alloy including nickel at more than about 23 atomic percent.

10. The substrate of claim 9 wherein:

said near-surface substrate region, incorporating the control layer and an adjacent portion of the non-magnetic metallic layer, incorporates nickel at less than about 15 atomic percent.

11. The substrate of claim 10 wherein:

said near-surface substrate region incorporates nickel at less than about 12.5 atomic percent.

12. The substrate of claim 1 further including:

multiple texturing features formed throughout at least a selected region of the substantially planar surface, protruding outwardly from a nominal surface plane of said control layer, and cooperating to define a surface roughness of the selected region.

13. The substrate of claim 12 wherein:

the substrate base is disk shaped, and the selected region comprises an annular transducing head contact zone.

14. The substrate of claim 12 wherein:

the texturing features are rounded, substantially free of sharp edges, and substantially uniform in their height above the nominal surface plane.

15. A magnetic recording medium including the substrate of claim 12, and further including:

a magnetizable film formed over said control layer and having a substantially uniform thickness.

16. The storage medium of claim 15 further including:

a non-magnetizable metallic underlayer deposited onto the control layer and disposed between the control layer and the magnatizable film.

17. The storage medium of claim 15 further including:

a protective cover layer deposited on the magnetizable film at a substantially uniform thickness.

18. The substrate of claim 1 wherein:

The non-magnetizable metallic layer has a uniform thickness in the range of about 2–10 microns.

19. A magnetic data storage disk substrate, including:

a substrate body including a non-magnetizable base, and a non-magnetizable metallic layer formed over the base having a metallic layer thickness and including nickel at at least 23 atomic percent, said non-magnetizable metallic layer including an oxidation region in the form of an oxidation layer and defining a substantially planar substrate surface having a nominal surface plane;

wherein a near-surface region of the substrate, including the oxidation layer and extended inwardly from the substrate surface to a depth up to about 60 angstroms, incorporates nickel at less than about 15 atomic percent.

20. The substrate of claim 19 wherein:

said non-magnetic metallic layer has a substantially uniform thickness within a range from about 2 microns to about 10 microns.

21. The substrate of claim 20 wherein:

the non-magnetic metallic layer is formed of a nickel-phosphorus alloy.

22. The substrate of claim 19 wherein:

said oxidation layer consists essentially of a water soluble borate.

23. The substrate of claim 22 wherein:

the water soluble borate is composed substantially of sodium tetraborate.

24. The substrate of claim 22 wherein:

said near surface region incorporates boron.

25. The substrate of claim 19 wherein:

said oxidation layer consists essentially of a water soluble silicate.

26. The substrate of claim 25 wherein:

the water soluble silicate is composed substantially of sodium metasilicate.

27. The substrate of claim 25 wherein:

said near surface region incorporates silicon at an atomic percent greater than about 5.

28. The substrate of claim 27 wherein:

the near surface layer incorporates silicon at an atomic percent greater than about 8.

29. The substrate of claim 19 wherein:

the substrate base is formed of aluminum.

30. The substrate of claim 19 further including:

multiple texturing features formed at least throughout a selected region of the substrate surface and protruding outwardly from the nominal surface plane to define a surface roughness of the substrate throughout the selected region.

31. The substrated claim 30 wherein:

the substrate body is disk shaped, and the selected region is an annular transducing head contract zone.

32. A magnetic data storage medium including the substrate of claim 29, and further including:

a magnetizable film formed over said substrate surface and having a substantially uniform thickness.

33. A process for treating a magnetic recording medium substrate, including:

providing a substrate body including a non-magnetizable substrate base and a non-magnetizable metallic layer formed over the base and defining a substantially planar substrate outer surface, said non-magnetic metallic layer incorporating nickel at more than about 23 atomic percent; and controllably oxidizing a portion of the substrate body including at least part of the substrate surface, to form a near surface region including said at least part of the substrate surface and extending inwardly therefrom to a depth up to about 60 angstroms and incorporating the nickel at less than about 15 atomic percent.

34. The process of claim 33 further including:

incorporating boron into said near surface region.

35. The process of claim 33 further including:

incorporating a silicate into the near surface region at an atomic percent of at least about 5.

36. The process of claim 33 wherein:

said controllably oxidizing the substrate body comprises maintaining the substrate body in an aqueous borate solution.

37. The process of claim 36 wherein:

the aqueous solution is a sodium tetraborate decahydrate solution.

38. The process of claim 33 wherein:

said controllably oxidizing the substrate body comprises maintaining the substrate body in an aqueous silicate solution for a predetermined period of time.

39. The process of claim 38 wherein:

said aqueous silicate solution comprises a sodium metasilicate solution.

40. The process of claim 33 further including:

after controllably oxidizing the substrate body, concentrating coherent energy onto the substrate surface at multiple locations throughout the selected surface region, to form at each location a texturing feature.

41. The process of claim 40 further including:

after forming the texturing features, applying a thin film, non-magnetizable crystalline metallic layer over the substrate surface at a substantially uniform thickness to substantially replicate a topography of the substrate surface; and applying a thin film magnetic recording layer over the crystalline metallic layer, at a uniform thickness to again substantially replicate said surface topography.

42. A substrate for a magnetic data storage disk, including:

a substrate base formed of a non-magnetizable material;

a non-magnetizable metallic layer formed over the substrate base and having a substantially planar substrate surface defining a nominal surface plane; and multiple texturing features protruding outwardly from the nominal surface plane over at least a selected region of the substantially planar substrate surface, said texturing features having respective heights above the nominal surface plane and further having respective diameters in directions parallel to the nominal surface plane, wherein the respective height and diameter of each of said texturing features define a diameter-to-height ratio of at least about 700.

43. The substrate of claim 42 wherein:

the substrate base is disk shaped, and the selected region comprises an annular transducing head contact zone.

44. The substrate of claim 42 wherein:

the texturing features are rounded, substantially free of sharp edges, and substantially uniform in their height above the nominal surface plane.

45. A magnetic recording medium including the substrate of claim 42, and further including:

a magnetizable film formed over said substrate surface and having a substantially uniform thickness.

46. The substrate of claim 42 wherein:

the non-magnetizable metallic layer incorporates a constituent selected from the group consisting of: a water soluble borate, a water soluble silicate, and their combination.

* * * * *